US012764182B2

(12) United States Patent
Everson

(10) Patent No.: US 12,764,182 B2
(45) Date of Patent: Oct. 13, 2026

(54) SELECTIVE PRUNING OF CANDIDATE LOAD-BALANCING SERVERS

(71) Applicant: Capital One Services, LLC, McLean, VA (US)

(72) Inventor: Richard Everson, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/594,705

(22) Filed: Mar. 4, 2024

(65) Prior Publication Data

US 2025/0280051 A1 Sep. 4, 2025

(51) Int. Cl.
*G06F 15/173* (2006.01)
*H04L 67/1008* (2022.01)
*H04L 67/1012* (2022.01)

(52) U.S. Cl.
CPC ...... *H04L 67/1012* (2013.01); *H04L 67/1008* (2013.01)

(58) Field of Classification Search
CPC ........................ H04L 67/1012; H04L 67/1008
USPC .......................................................... 709/238
See application file for complete search history.

(56) References Cited

U.S. PATENT DOCUMENTS

| | | | | |
|---|---|---|---|---|
| 6,269,396 | B1 * | 7/2001 | Shah | H04L 41/0803 709/223 |
| 6,360,333 | B1 * | 3/2002 | Jansen | G06F 11/2236 714/E11.166 |
| 6,601,084 | B1 | 7/2003 | Bhaskaran et al. | |
| 7,908,314 | B2 * | 3/2011 | Yamaguchi | H04L 67/02 709/215 |
| 7,962,915 | B2 * | 6/2011 | Eshel | G06F 11/2025 714/2 |
| 8,489,744 | B2 * | 7/2013 | Elyashev | H04L 67/1001 718/1 |
| 8,694,638 | B2 * | 4/2014 | Elyashev | G06F 9/505 718/1 |
| 8,793,691 | B2 * | 7/2014 | Devadhar | G06F 9/546 718/100 |
| 8,826,292 | B2 * | 9/2014 | Heim | G06F 9/5088 718/1 |
| 9,270,746 | B2 * | 2/2016 | Lyon | H04L 67/1019 |
| 10,089,309 | B2 * | 10/2018 | Polacek | H04L 67/1008 |
| 10,176,303 | B1 * | 1/2019 | O'Neall | G06F 21/6218 |
| 10,346,550 | B1 * | 7/2019 | Botta | G06F 16/2228 |
| 10,389,603 | B2 * | 8/2019 | Coburn | H04L 41/0806 |
| 10,498,617 | B1 * | 12/2019 | Dothan | H04L 67/1004 |
| 10,571,983 | B2 * | 2/2020 | Allen-Ware | G06F 1/3206 |
| 10,683,744 | B2 * | 6/2020 | Torrione | E21B 47/10 |
| 10,726,105 | B2 * | 7/2020 | O'Neall | H04L 63/102 |
| 10,788,957 | B1 * | 9/2020 | Lenzner | G06F 40/143 |
| 10,810,043 | B2 * | 10/2020 | Bahramshahry | G06F 9/4881 |
| 10,942,824 | B2 * | 3/2021 | Volos | G06F 11/203 |
| 10,956,222 | B2 * | 3/2021 | Bahramshahry | G06F 9/505 |

(Continued)

*Primary Examiner* — Alicia Baturay
(74) *Attorney, Agent, or Firm* — Harrity & Harrity, LLP

(57) ABSTRACT

In some implementations, a load-balancing system may identify one or more computational tasks. The load-balancing system may identify a plurality of candidate servers in a load-balancing server pool. The load-balancing system may identify one or more servers by selectively pruning the plurality of candidate servers. The load-balancing system may assign the one or more computational tasks to the one or more servers.

20 Claims, 6 Drawing Sheets

300

(56) References Cited

U.S. PATENT DOCUMENTS

| | | | | |
|---|---|---|---|---|
| 10,999,361 | B2 * | 5/2021 | Husar | H04L 67/1023 |
| 11,029,739 | B2 * | 6/2021 | Allen-Ware | G06F 1/3228 |
| 11,226,848 | B2 * | 1/2022 | Bahramshahry | G06F 11/1458 |
| 11,237,865 | B2 * | 2/2022 | Bahramshahry | G06F 9/5005 |
| 11,237,866 | B2 * | 2/2022 | Bahramshahry | G06F 9/5016 |
| 11,238,022 | B1 * | 2/2022 | Botta | G06F 16/148 |
| 11,243,807 | B2 * | 2/2022 | Bahramshahry | G06F 9/4881 |
| 11,243,818 | B2 * | 2/2022 | Bahramshahry | H04L 41/5019 |
| 11,321,427 | B2 * | 5/2022 | O'Neall | G06F 21/10 |
| 11,429,417 | B2 * | 8/2022 | Denny | G06F 9/45558 |
| 11,429,418 | B2 * | 8/2022 | Denny | G06F 9/45558 |
| 11,687,360 | B2 * | 6/2023 | Denny | G06F 9/45558 718/1 |
| 11,846,934 | B2 * | 12/2023 | Law | G05B 19/042 |
| 11,960,920 | B2 * | 4/2024 | Denny | G06F 11/1451 |
| 12,028,374 | B2 * | 7/2024 | Soryal | G06N 5/04 |
| 12,072,770 | B2 * | 8/2024 | Bafna | G06F 11/2092 |
| 12,164,383 | B2 * | 12/2024 | Rathi | G06F 16/188 |
| 12,236,265 | B2 * | 2/2025 | Shpilyuck | G06F 9/4881 |
| 12,363,164 | B2 * | 7/2025 | Soryal | H04L 51/212 |
| 12,541,436 | B2 * | 2/2026 | Gotkhindikar | G06F 11/1451 |
| 2019/0050872 | A1 * | 2/2019 | Yu | G06Q 30/0201 |
| 2020/0026579 | A1 * | 1/2020 | Bahramshahry | G06F 9/5077 |
| 2020/0133651 | A1 * | 4/2020 | Holzer | G06F 8/65 |
| 2021/0034397 | A1 * | 2/2021 | Denny | G06F 16/128 |
| 2024/0027996 | A1 * | 1/2024 | Yang | G05B 19/4099 |
| 2024/0073295 | A1 * | 2/2024 | Yu | H04L 67/55 |
| 2024/0202039 | A1 * | 6/2024 | Peng | G06F 9/5044 |
| 2024/0281671 | A1 * | 8/2024 | Phokela | G06N 5/022 |
| 2025/0086006 | A1 * | 3/2025 | Kulkarni | G06F 9/4881 |

* cited by examiner

SELECTIVE PRUNING OF CANDIDATE LOAD-BALANCING SERVERS

BACKGROUND

Load-balancing involves distributing a set of tasks over a set of resources. The tasks may be distributed among the resources based on the specific nature of the tasks, the complexity of the tasks, the hardware capabilities of the resources, error tolerance for the tasks, or the like. Load-balancing may improve the overall processing efficiency of the tasks.

SUMMARY

Some aspects described herein relate to a system for load-balancing. The system may include one or more memories and one or more processors coupled to the one or more memories. The one or more processors may be configured to identify one or more computational tasks. The one or more processors may be configured to identify a plurality of candidate servers in a load-balancing server pool. The one or more processors may be configured to identify one or more servers by selectively pruning the plurality of candidate servers based on one or more computational task completion failures occurring within a length of time before the selective pruning of the plurality of candidate servers. The one or more computational task completion failures may be associated with one or more candidate servers of the plurality of candidate servers. The one or more processors may be configured to assign the one or more computational tasks to the one or more servers.

Some aspects described herein relate to a method of load-balancing. The method may include identifying one or more computational tasks. The method may include identifying a plurality of candidate servers in a load-balancing server pool. The method may include identifying one or more servers by selectively pruning the plurality of candidate servers based on at least one average central processing unit (CPU) utilization, associated with at least one candidate server of the plurality of candidate servers, over a quantity of CPU cycles satisfying an average CPU utilization threshold. The method may include assigning the one or more computational tasks to the one or more servers.

Some aspects described herein relate to a non-transitory computer-readable medium that stores a set of instructions by a device. The set of instructions, when executed by one or more processors of the device, may cause the device to identify one or more computational tasks. The set of instructions, when executed by one or more processors of the device, may cause the device to identify a plurality of candidate servers in a load-balancing server pool. The set of instructions, when executed by one or more processors of the device, may cause the device to identify one or more servers by selectively pruning the plurality of candidate servers based on computational task counts associated with respective candidate servers of the plurality of candidate servers. The set of instructions, when executed by one or more processors of the device, may cause the device to assign the one or more computational tasks to the one or more servers.

DETAILED DESCRIPTION

Figure 1:
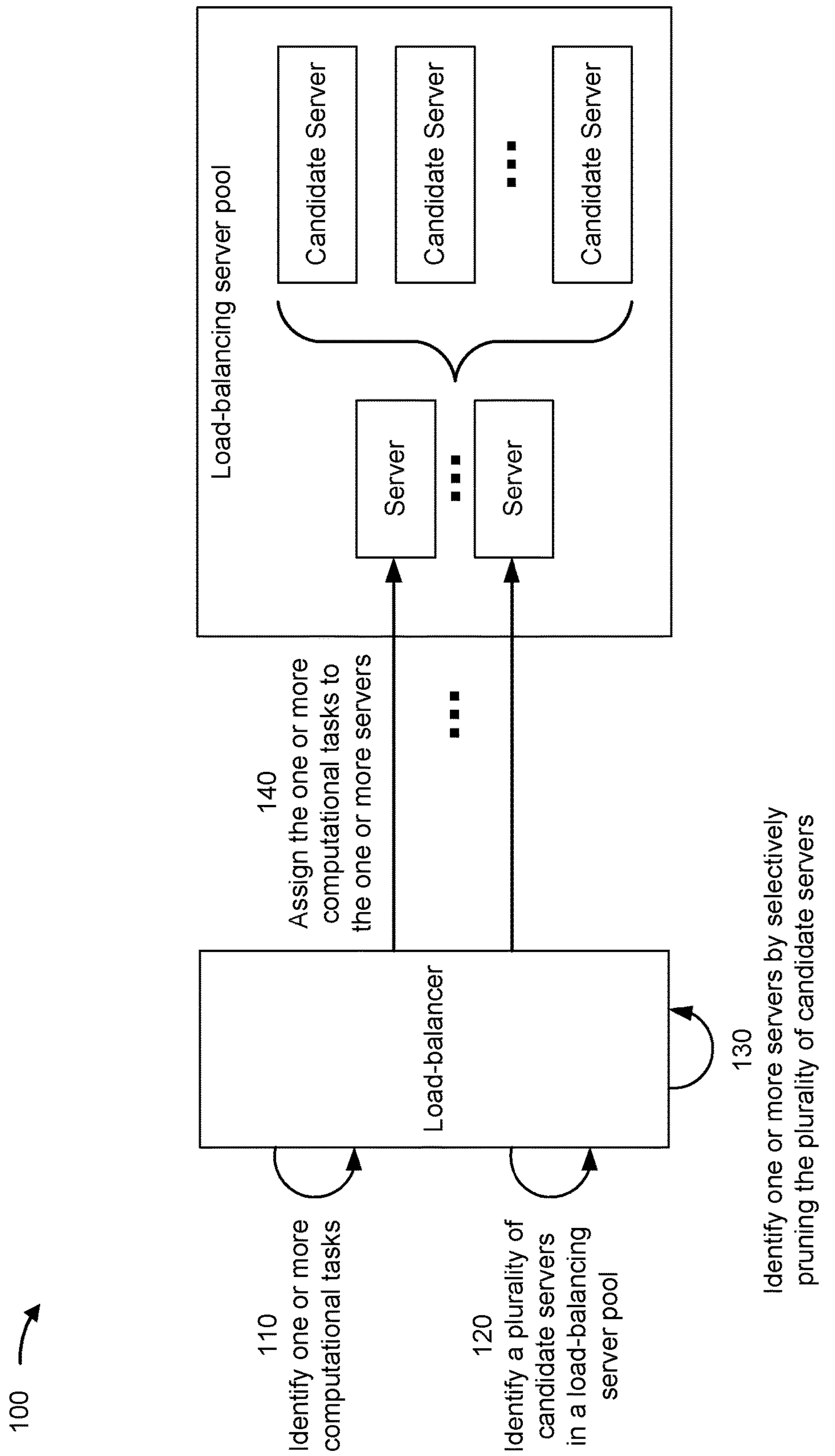
FIG. 1 is a diagram of an example associated with load-balancing one or more computational tasks, in accordance with some embodiments of the present disclosure.

The following detailed description of example implementations refers to the accompanying drawings. The same reference numbers in different drawings may identify the same or similar elements.

In computing, the term "job" may refer to a unit of work or execution performed by one or more resources (e.g., servers). A job may have multiple components referred to as "tasks." For example, one or more servers may complete a job by executing the corresponding tasks. In some examples, tasks may be placed in a queue and spawned for execution by the one or more servers. A queuing instance (e.g., a queuing server) may be responsible for managing the queuing of the tasks and related operations.

One approach to handling tasks may be referred to as "vertical scaling." In vertical scaling, the queuing instance may also execute the tasks. For example, the queuing instance may monitor an execution state of a spawned task to identify when the task has completed (e.g., when the task has been fully executed) after which the queuing instance may begin to execute a subsequent task. Thus, vertical scaling may be a blocking process that involves singular processing of the queue (e.g., in the sense that only one task may be spawned at a time). Furthermore, by executing the tasks, the queuing instance may experience excessive resource pressure caused by running large processes that concurrently consume a limited set of resources (e.g., the queuing instance). As a result, vertical scaling may overburden the queuing instance.

In another approach to handling tasks, the queuing instance may identify a server to assign a single task based on direct assignment or by leveraging a resource utilization metric that is averaged over a small window (e.g., 1-2 minutes). As a result, the queuing instance can indiscriminately assign tasks to servers, assign entire ranges of tasks to a single system (e.g., server), or the like. Thus, this approach can lead to overloaded servers, increased run times, bypassed servers that are inactive or minimally busy, or the like.

Some implementations described herein enable dividing a list or load of tasks (e.g., subtasks) across multiple servers in parallel, which may be referred to as horizontal scaling or horizontal load-balancing. A queuing instance may identify, from among a plurality of candidate servers, servers to assign tasks. For example, the queueing instance may identify which of the candidate servers are qualified (e.g., preferred) for handling one or more of the tasks. In some examples, the queueing instance may prune candidate servers that experienced a task completion failure within a previous time window. In some examples, the queueing instance may prune candidate servers having average CPU utilizations (e.g., averaged over a given quantity of previous CPU cycles) that exceed a target average CPU utilization. In some examples, the queueing instance may prune candidate servers that are already assigned a large quantity of computation task counts (e.g., relative to other candidate servers).

As a result, by leveraging multiple servers, the queueing instance may avoid becoming overburdened due to vertical scaling. Furthermore, by assigning tasks to the qualified servers, the queuing instance may help to ensure that the servers are not overloaded or underutilized and reduce run times associated with execution of the tasks. Pruning candidate servers that experienced a task completion failure within a previous time window may help to ensure that tasks are assigned to servers that are functioning correctly. Pruning candidate servers having average CPU utilizations that exceed a target average CPU utilization may help to reduce CPU utilization among the servers. Pruning candidate servers that are already assigned a large quantity of computation task counts may help to prevent servers from becoming idle or overworked.

FIG. 1 is a diagram of an example 100 associated with load-balancing one or more computational tasks. As shown in FIG. 1, example 100 includes a load-balancer and a load-balancing server pool. The load-balancer may be any suitable device or system configured to perform load-balancing techniques described herein. For example, the load-balancer may be, or include, a queuing server, a queuing instance, or the like. The load-balancing server pool may include a plurality of candidate servers. These devices are described in more detail in connection with FIGS. 4 and 5.

As shown by reference number 110, the load-balancer may identify one or more computational tasks. The computational tasks may correspond to work to be performed by one or more servers. In some examples, the computational tasks may relate to content creation, such as text creation, image creation, or the like. For example, a large generative process (e.g., a generative artificial intelligence (AI) process) may be split into smaller units of work (e.g., the computational tasks) for handling of generative output. Upon completion of the computational tasks, the outputs of the computational tasks may be consolidated to produce a singular dataset (e.g., a single generative output). Although the computational tasks may relate to content creation in some examples, in other examples the computational tasks may relate to any suitable job.

In some aspects, the computational tasks may be generated automatically. For example, process-driven code (e.g., a calling process) may generate a list of the computational tasks. In some aspects, the computational tasks may be generated based on user input. For example, a user-driven process may generate a list of the computational tasks (e.g., the list of computational tasks may be generated at least in part by a user).

As shown by reference number 120, the load-balancer may identify a plurality of candidate servers in the load-balancing server pool. The candidate servers may be servers to which the load-balancer can potentially assign the computational tasks. The load-balancer may identify the plurality of candidate servers based on how the servers are designated. For example, the load-balancer may identify the plurality of candidate servers as any servers designated for data management.

As shown by reference number 130, the load-balancer may identify one or more servers by selectively pruning the plurality of candidate servers. For example, the one or more servers may be a set (e.g., a subset) of the candidate servers that are qualified for handling the computational tasks. In some examples, selectively pruning the plurality of candidate servers may include pruning the plurality of candidate servers (e.g., the load-balancer may exclude at least one candidate server, which is not qualified, from the one or more servers). In some examples, selectively pruning the plurality of candidate servers may include refraining from pruning the plurality of candidate servers (e.g., in cases where all of the candidate servers are considered qualified).

In some aspects, the load-balancer may selectively prune the plurality of candidate servers based on one or more computational task completion failures occurring within a length of time before the selective pruning of the plurality of candidate servers. The one or more computational task completion failures may be associated with one or more candidate servers of the plurality of candidate servers. For example, the one or more computational task completion failures may be associated with one or more candidate servers in that the one or more candidate servers may have experienced the one or more computational task completion failures. For example, the load-balancer may prune any candidate servers that have experienced a failed task within the past N minutes or cycles. Thus, the load-balancer may leverage a health check to deem available a qualified server based on recent activity.

In some aspects, the load-balancer may selectively prune the plurality of candidate servers based on at least one average CPU utilization, associated with at least one candidate server of the plurality of candidate servers, over a quantity of CPU cycles satisfying an average CPU utilization threshold. The at least one average CPU utilization may be associated with the at least one candidate server in that the at least one candidate server may have reached the at least one average CPU utilization. For example, the load-balancer may prune any candidate servers that have a CPU utilization, averaged over the past M CPU cycles, that exceeds the average CPU utilization threshold (e.g., an appropriate maximum level). Thus, the load-balancer may identify the lowest utilizations (e.g., average CPU utilizations) to deem available a qualified server based on a recent resource (e.g., CPU) utilization of the serve being within the average CPU utilization threshold.

In some aspects, the load-balancer may selectively prune the plurality of candidate servers based on computational task counts associated with respective candidate servers of the plurality of candidate servers. The computational task counts may be associated with respective candidate servers in that the computational task counts may be currently assigned to the respective candidate servers. For example, the load-balancer may prune any candidate servers that have a relatively high computational task count (e.g., compared to the computational task counts of other candidate servers). Thus, the load-balancer may leverage an availability check to prioritize servers having fewer active computational tasks.

In some aspects, the load-balancer may selectively prune one or more candidate servers, of the respective candidate servers, associated with nonzero computational task counts. The one or more candidate servers may be associated with nonzero computational task counts in that the one or more candidate server may have no currently assigned computational tasks. For example, the load-balancer may prune the one or more candidate servers based on the one or more candidate servers being active (e.g., having at least one currently assigned computational task). Thus, the load-balancer may prioritize inactive servers over active servers.

As shown by reference number 140, the load-balancer may assign the one or more computational tasks to the one or more servers. For example, the load-balancer may assign the computational tasks to the most qualified and/or available servers. The load-balancer may assign the computational tasks after generating a list of the one or more servers.

In some aspects, the load-balancer may assign at least one computational task to a candidate server, of the plurality of candidate servers, that is not one of the one or more servers. For example, if no qualified (e.g., ideal) servers are available, then the load-balancer may fall back to randomly assigning computational tasks to candidate servers.

In some examples, the load-balancer may implement logic, referred to herein as an "infinite partitioner," that causes the load-balancer to implement techniques described herein. For example, the load-balancer may leverage an infinite partitioner to allow for horizontal scaling while awaiting completion of each computational tasks. By leveraging an infinite partitioner, the load-balancer may help to ensure that the computational tasks are completed with a maximum degree of parallelism constrained by the quantity of like servers (e.g., candidate servers and/or best-case servers). For example, infinite partitioner may enable the load-balancer to process the generated list of computational tasks in parallel and assign a given computational task to an available server that is defined as suitable for a type of the given computational task.

Identifying one or more servers by selectively pruning the plurality of candidate servers may enable the load-balancer to leverage multiple servers and thereby avoid becoming overburdened due to vertical scaling. Furthermore, by assigning computational tasks to the one or more (qualified) servers, the load-balancer may help to ensure that the one or more servers are not overloaded or underutilized and may reduce run times associated with execution of the computational tasks. As a result, resource availability may be improved for additional concurrent computational tasks. Additionally, or alternatively, individual servers may require fewer resources to complete a set of computational tasks (e.g., smaller servers may be implemented). Thus, an entity (e.g., a developer, end user, or the like) may easily horizontally load-balance a list of computational tasks across multiple servers.

Selectively pruning the plurality of candidate servers based on the one or more computational task completion failures occurring within a length of time before the selective pruning of the plurality of candidate servers may help to ensure that the plurality of computational tasks are assigned to servers that are functioning correctly.

Selectively pruning the plurality of candidate servers based on at least one average CPU utilization, associated with at least one candidate server of the plurality of candidate servers, over a quantity of CPU cycles satisfying an average CPU utilization threshold may help to reduce CPU utilization among the plurality of servers, thereby conserving CPU resources.

Selectively pruning the plurality of candidate servers based on computational task counts associated with respective candidate servers of the plurality of candidate servers may help to prevent servers from becoming idle or overworked.

Assigning at least one computational task of the plurality of computational tasks to a candidate server, of the plurality of candidate servers, that is not one of the one or more servers may help to ensure that one or more jobs corresponding to the plurality of computation tasks are completed even if no best-case servers are available to handle one or more of the computational tasks.

As indicated above, FIG. 1 is provided as an example. Other examples may differ from what is described with regard to FIG. 1.

Figure 2:
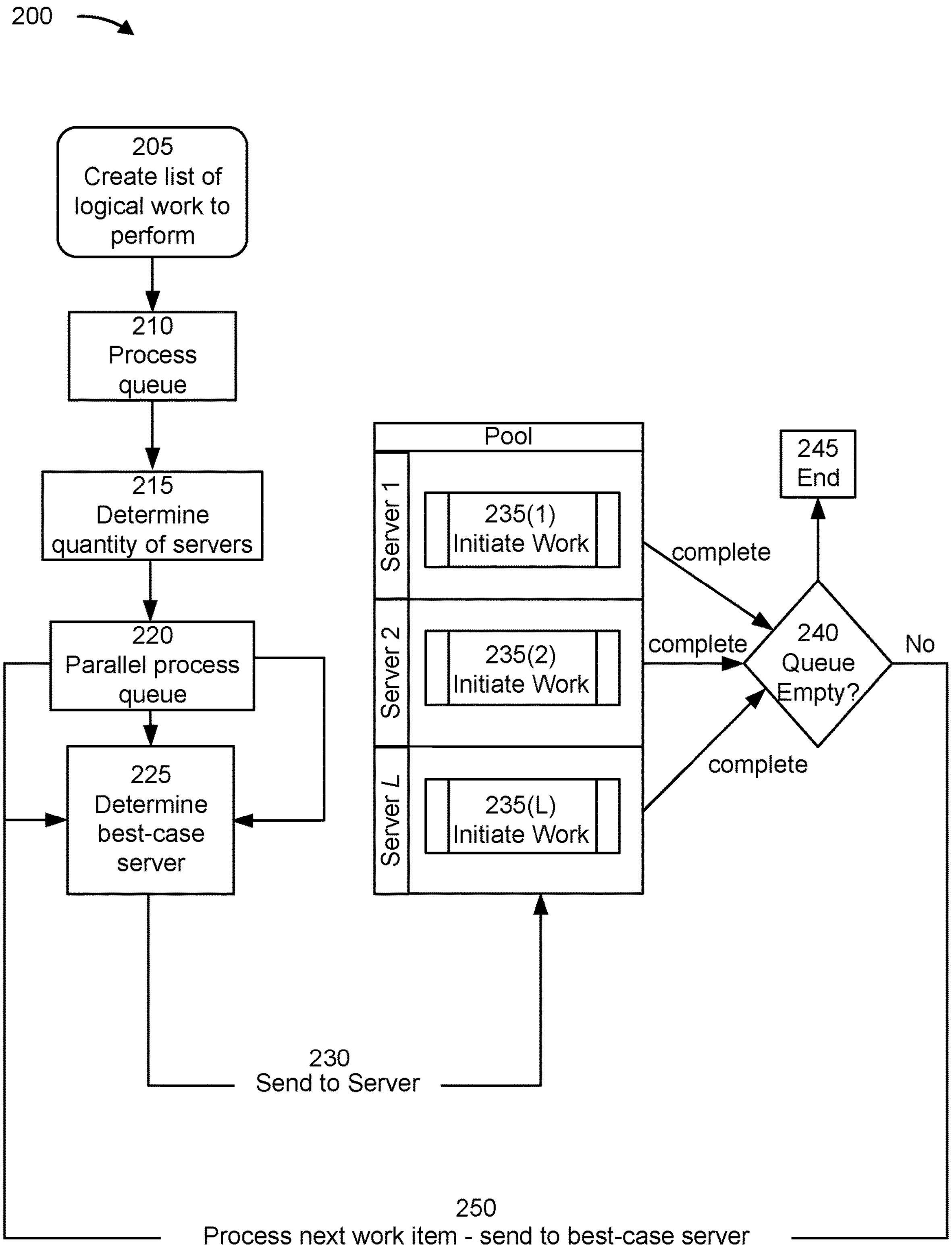
FIG. 2 is a diagram of an example associated with load-balancing of computational tasks across servers, in accordance with some embodiments of the present disclosure.

FIG. 2 is a diagram of an example 200 associated with load-balancing of computational tasks across servers.

As shown by reference number 205, a load-balancer may identify a plurality of computational tasks. For example, the load-balancer may create a list of logical work (e.g., the computational tasks and/or corresponding jobs) to be performed. As shown by reference number 210, the load-balancer may place the computational tasks in a process queue. As shown by reference number 215, the load-balancer may identify a plurality of candidate servers in a load-balancing server pool ("Pool"). For example, the load-balancer may determine a quantity of candidate servers while the computational tasks are in the process queue.

As shown by reference number 220, the load-balancer may place the computational tasks in a parallel process queue. As shown by reference number 225, the load-balancer may determine the best-case server(s) ("Server 1" through "Server L") to handle the computational tasks that are in the parallel process queue. For example, the load-balancer may selectively prune the candidate servers to identify the best-case servers as described elsewhere herein.

As shown by reference number 230, the load-balancer may assign the computational tasks across the plurality of servers. For example, the load-balancer may send the computational tasks to one or more of the identified best-case servers. As shown by reference numbers 235(1)-235(L), servers 1-L may initiate the work (e.g., the servers 1-L may execute the computational tasks assigned by the load-balancer). When a computational task is completed, a corresponding wait block of the parallel process may be also be completed.

As shown by reference number 240, upon completion of the computational tasks, the load-balancer may determine whether the parallel process queue is empty. If the parallel process queue is empty, then, as shown by reference number 245, the process may end. If the parallel process queue is not empty, then, as shown by reference number 250, the load-balancer may process the next work item (e.g., computational task) in the parallel process queue. For example, the load-balancer may send (e.g., assign) the next computational task in the parallel process queue to one of the servers 1-L (e.g., a best available server).

In this manner, the load-balancer may iterate through the list of computational tasks in parallel. As each task completes, the load-balancer may remove the computational task from the list and continue through the parallel processing queue by repeating operations associated with reference numbers 225-240 until the list has been exhausted.

As indicated above, FIG. 2 is provided as an example. Other examples may differ from what is described with regard to FIG. 2.

Figure 3:
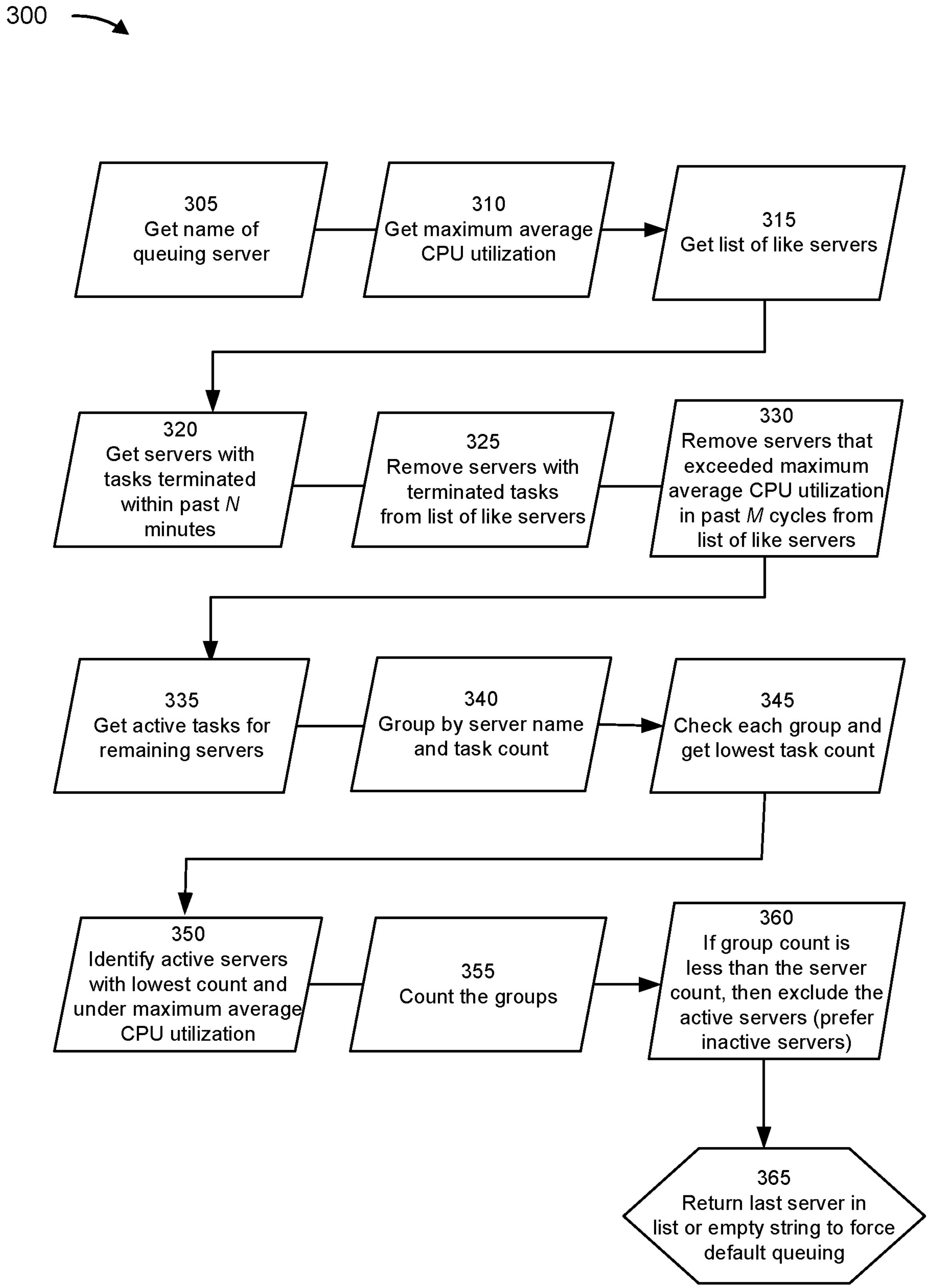
FIG. 3 is a diagram of an example associated with determining a best-case server, in accordance with some embodiments of the present disclosure.

FIG. 3 is a diagram of an example 300 associated with determining a best-case server (e.g., in accordance with reference number 225 (FIG. 2)).

As shown by reference number 305, the load-balancer may obtain a name of a queuing server. The queueing server may execute the infinite partitioner logic and assign the computational tasks from the parallel processing queue to one or more qualified servers. The queuing server may be one of the candidate servers in the load-balancing server pool or a separate server that is external to the load-balancing server pool.

As shown by reference number 310, the load-balancer may obtain a maximum average CPU utilization. For example, the load-balancer may obtain an average CPU utilization threshold. The average CPU utilization threshold may be configurable to any suitable value.

As shown by reference number 315, the load-balancer may obtain a list of like servers. For example, the load-balancer may obtain a list of the candidate servers in the load-balancing server pool. For example, the load-balancer may obtain a list of servers designated for data management that can potentially execute the computational tasks.

As shown by reference number 320, the load-balancer may obtain an indication of candidate servers that have had a computational task terminated (e.g., computational task completion failure) within the past N minutes. As shown by reference number 325, the load-balancer may remove servers with terminated computational tasks within the past N minutes from the list of like servers. For example, the load-balancer may prune the candidate servers with such terminated computational tasks.

As shown by reference number 330, the load-balancer may remove, from the list of like servers, any servers that have exceeded the maximum average CPU utilization in the past M CPU cycles. For example, the lead-balancer may prune any candidate servers having an average CPU utilization over M CPU cycles that satisfies (e.g., exceeds) the average CPU utilization threshold. For example, if the average CPU utilization threshold is 70%, and a candidate server operated at 90% CPU utilization over the past M CPU cycles (e.g., 3, or any other suitable quantity, of CPU cycles), then the load-balancer may exclude that candidate server from the list of servers that are to handle the computational tasks.

As shown by reference number 335, the load-balancer may obtain an indication of active computational tasks for any remaining servers in the list of like servers. For example, the load-balancer may identify quantities of computational tasks that are currently assigned to respective candidate servers (e.g., computational task counts for the candidate servers).

As shown by reference number 340, the load-balancer may group the remaining candidate servers by server name and task count. For example, the load-balancer may sort the remaining candidate servers based on how much work the candidate servers are currently handling.

As shown by reference number 345, the load-balancer may check each group and obtain the lowest task count of the groups. As shown by reference number 350, the load-balancer may identify the server(s) with the lowest computational task count. The identified server(s) may have average CPU utilization(s) under the average CPU utilization threshold.

As shown by reference number 355, the load-balancer may count the groups. As shown by reference number 360, if the count of groups is less than the count of remaining (e.g., non-pruned) servers, then the load-balancer may exclude active servers to prioritize the inactive servers. The active servers may be those with computational tasks currently assigned, and inactive servers may have no computational tasks currently assigned. For example, the load-balancer may prune one or more candidate servers associated with nonzero computational task counts.

As shown by reference number 365, the load-balancer may return the last server in the list or return an empty string to force default queuing. If the list contains at least one server after the pruning of candidate servers, then the load-balancer may return one or more servers (including the last server in the list). The last server in the list may be the best-case server (e.g., the server with the lowest computational task count that also has an average CPU utilization under the average CPU utilization threshold and has had no computational tasks terminated within the past N minutes). If the load-balancer, returns an empty string, then there are no remaining servers in the list, and the load-balancer may fall back to default queueing (e.g., by assigning computational tasks to candidate servers).

As indicated above, FIG. 3 is provided as an example. Other examples may differ from what is described with regard to FIG. 3.

Figure 4:
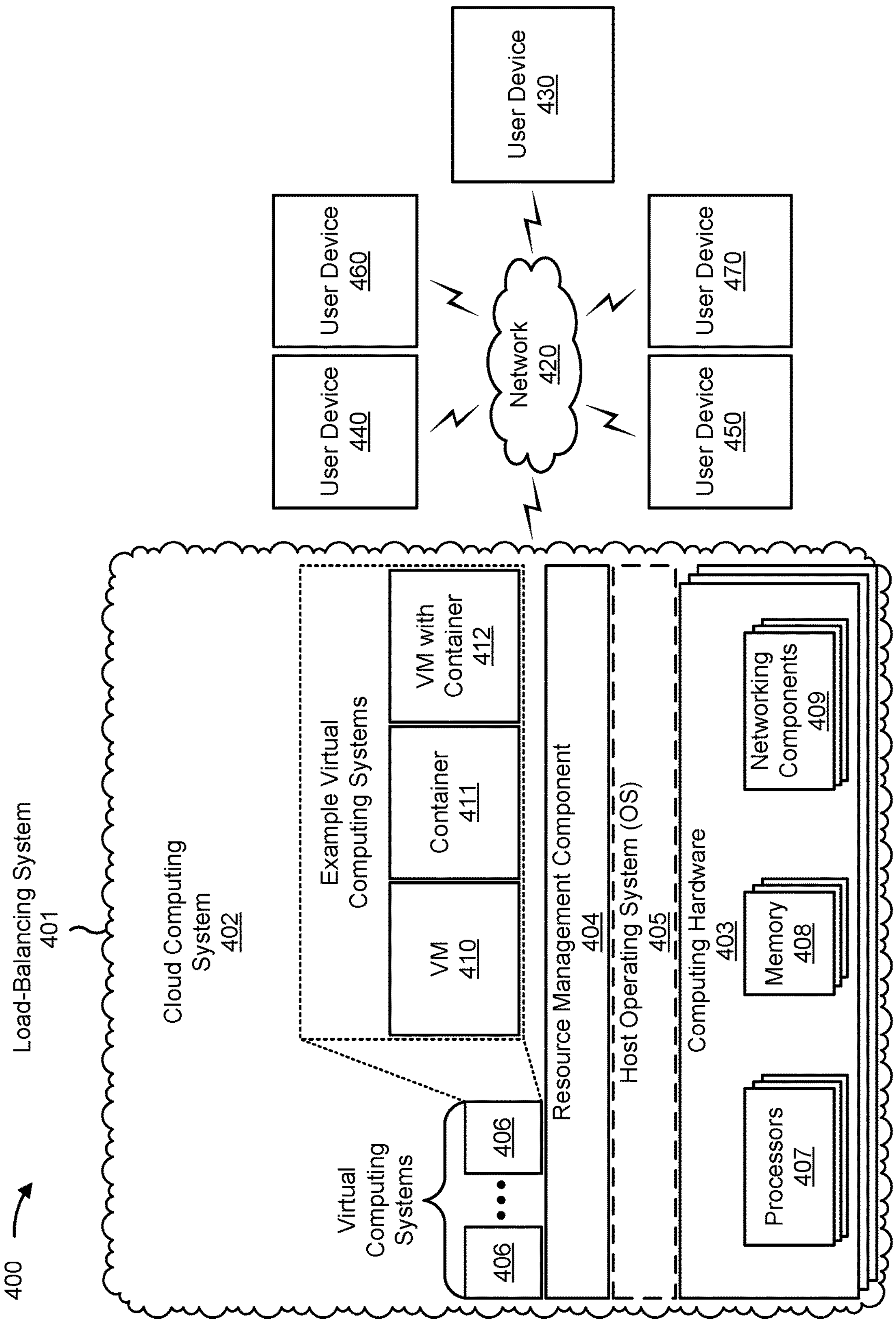
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a load-balancing system 401, which may include one or more elements of and/or may execute within a cloud computing system 402. The cloud computing system 402 may include one or more elements 403-412, as described in more detail below. As further shown in FIG. 4, environment 400 may include a network 420, and/or one or more of user devices 430-470. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the load-balancing system 401 may include one or more elements 403-412 of the cloud computing system 402, may execute within the cloud computing system 402, and/or may be hosted within the cloud computing system 402, in some implementations, the load-balancing system 401 may not be cloud-based (e.g., may be implemented outside of a cloud computing system) or may be partially cloud-based. For example, the load-balancing system 401 may include one or more devices that are not part of the cloud computing system 402, such as device 500 of FIG. 5, which may include a standalone server or another type of computing device. The load-balancing system 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The user devices 430-470 may include one or more devices capable of receiving, generating, storing, processing, and/or providing information associated with load-balancing, as described elsewhere herein. The user devices 430-470 may each include a communication device and/or a computing device. For example, the user devices 430-470 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
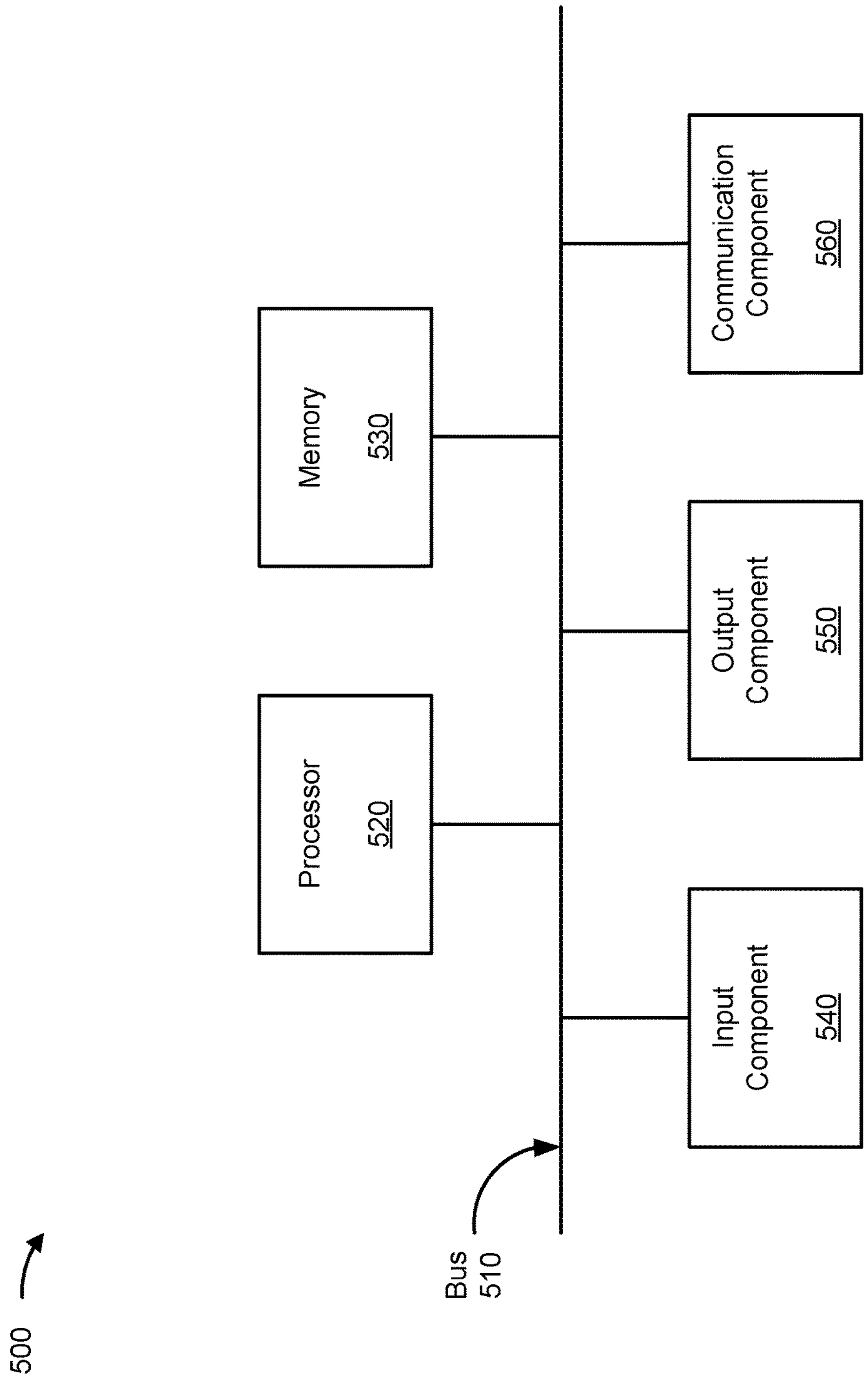
FIG. 5 is a diagram of example components of a device associated with selective pruning of candidate load-balancing servers, in accordance with some embodiments of the present disclosure.

FIG. 5 is a diagram of example components of a device 500 associated with selective pruning of candidate load-balancing servers. The device 500 may correspond to the load-balancing system 401. In some implementations, the load-balancing system 401 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
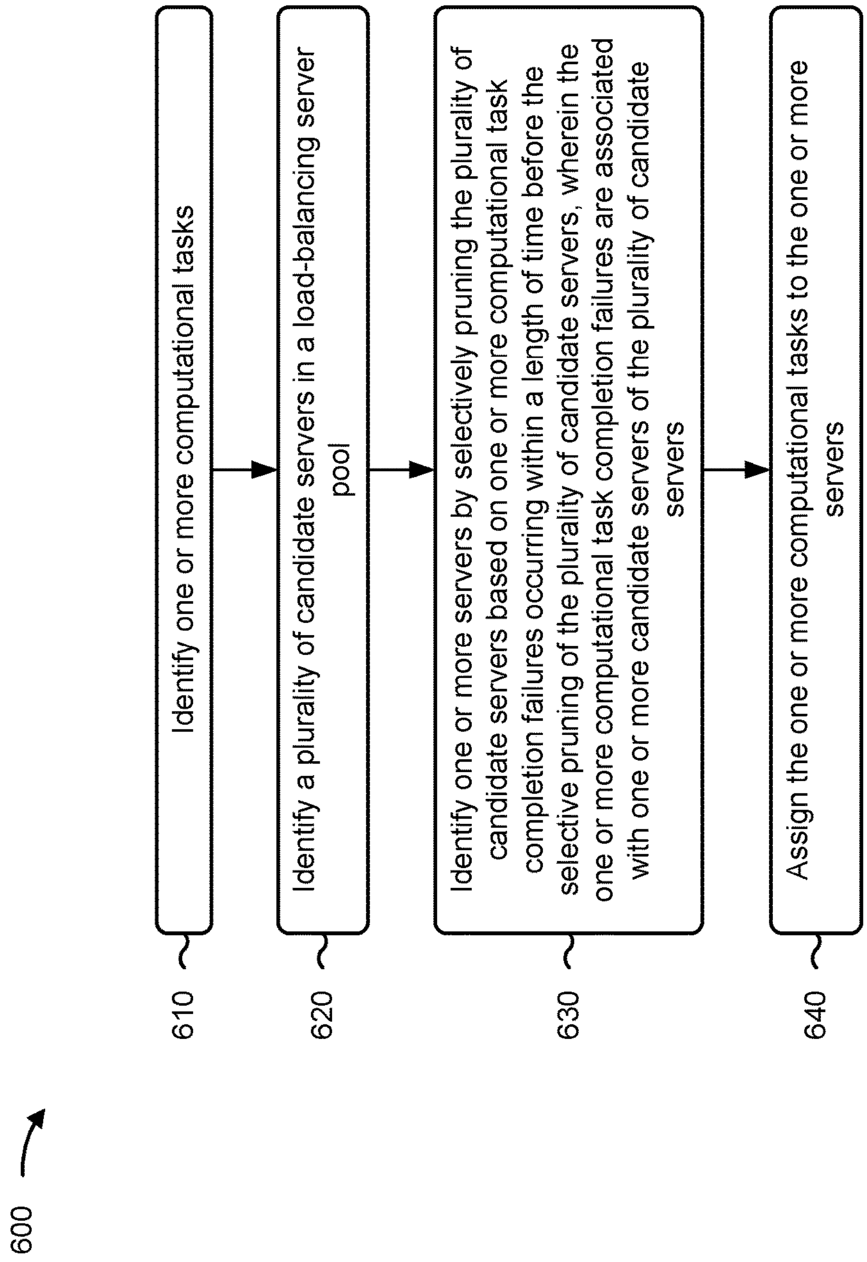
FIG. 6 is a flowchart of an example process associated with selective pruning of candidate load-balancing servers, in accordance with some embodiments of the present disclosure.

FIG. 6 is a flowchart of an example process 600 associated with selective pruning of candidate load-balancing servers. In some implementations, one or more process blocks of FIG. 6 may be performed by the load-balancing system 401. In some implementations, one or more process blocks of FIG. 6 may be performed by another device or a group of devices separate from or including the load-balancing system 401, such as the user devices 430-470. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include identifying one or more computational tasks (block 610). For example, the load-balancing system 401 (e.g., using processor 520 and/or memory 530) may identify one or more computational tasks, as described above in connection with reference number 110 of FIG. 1. As an example, the computational tasks may correspond to work to be performed by one or more servers.

As further shown in FIG. 6, process 600 may include identifying a plurality of candidate servers in a load-balancing server pool (block 620). For example, the load-balancing system 401 (e.g., using processor 520 and/or memory 530) may identify a plurality of candidate servers in a load-balancing server pool, as described above in connection with reference number 120 of FIG. 1. As an example, the candidate servers may be servers to which the load-balancer can potentially assign the computational tasks.

As further shown in FIG. 6, process 600 may include identifying one or more servers by selectively pruning the plurality of candidate servers based on one or more computational task completion failures occurring within a length of time before the selective pruning of the plurality of candidate servers, wherein the one or more computational task completion failures are associated with one or more candidate servers of the plurality of candidate servers (block 630). For example, the load-balancing system 401 (e.g., using processor 520 and/or memory 530) may identify one or more servers by selectively pruning the plurality of candidate servers based on one or more computational task completion failures occurring within a length of time before the selective pruning of the plurality of candidate servers, wherein the one or more computational task completion failures are associated with one or more candidate servers of the plurality of candidate servers, as described above in connection with reference number 130 of FIG. 1. As an example, the load-balancer may prune any candidate servers that have experienced a failed task within the past N minutes.

As further shown in FIG. 6, process 600 may include assigning the one or more computational tasks to the one or more servers (block 640). For example, the load-balancing system 401 (e.g., using processor 520 and/or memory 530) may assign the one or more computational tasks to the one or more servers, as described above in connection with reference number 140 of FIG. 1. As an example, the load-balancer may assign the computational tasks to the most qualified and/or available servers that have not been pruned.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1-3. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for load-balancing, the system comprising:
one or more memories; and
one or more processors, communicatively coupled to the one or more memories, configured to:
identify one or more computational tasks;
identify a plurality of candidate servers in a load-balancing server pool;
identify a first set of servers by selectively pruning the plurality of candidate servers based on one or more computational task completion failures occurring within a particular number of minutes before the selective pruning of the plurality of candidate servers, wherein the one or more computational task completion failures are associated with one or more candidate servers of the plurality of candidate servers;
identify a second set of servers by selectively pruning one or more respective servers, from the first set of servers, associated with non-zero computational task counts; and
assign the one or more computational tasks to one or more servers from the second set servers.

2. The system of claim 1, wherein the one or more processors, to identify the one or more servers, are configured to:
identify the one or more servers by selectively pruning the plurality of candidate servers based further on at least one average central processing unit (CPU) utilization, associated with at least one candidate server of the plurality of candidate servers, over a quantity of CPU cycles satisfying an average CPU utilization threshold.

3. The system of claim 1, wherein the one or more processors are further configured to:
assign at least one computational task to a candidate server, of the plurality of candidate servers, that is not one of the one or more servers.

4. The system of claim 1, wherein the one or more computational tasks are generated automatically.

5. The system of claim 1, wherein the one or more computational tasks are generated based on user input.

6. The system of claim 1, wherein the one or more processors, to identify the second set of servers, are configured to:
identify the second set of servers by selectively pruning one or more respective servers, from the first set of servers, based on the one or more respective servers having at least one currently assigned computational task.

7. The system of claim 1, wherein the one or more processors, to identify the one or more servers by selectively pruning one or more respective servers associated with nonzero computational task counts, are configured to:
group the first set of servers by server identifier and computational task count;
obtain, for each group, a corresponding lowest computational task count; and
selectively prune, based on obtaining the corresponding lowest computational task count for each group, the one or more respective servers associated with non-zero computational task counts.

8. A method of load-balancing, comprising:
identifying one or more computational tasks;
identifying a plurality of candidate servers in a load-balancing server pool;
identifying a first set of servers by selectively pruning the plurality of candidate servers based on at least one average central processing unit (CPU) utilization, associated with at least one candidate server of the plurality of candidate servers, over a quantity of CPU cycles satisfying an average CPU utilization threshold;
identifying a second set of servers by selectively pruning one or more respective servers, from the first set of servers, based further on one or more computational task completion failures occurring within a particular number of minutes before the selective pruning of the one or more respective servers, wherein the one or more computational task completion failures are associated with one or more candidate servers of the plurality of candidate servers; and assigning the one or more computational tasks to one or more servers from the second set of servers.

9. The method of claim 8, wherein identifying the one or more servers further includes:

identifying the one or more servers by selectively pruning the plurality of candidate servers based further on computational task counts associated with respective candidate servers of the plurality of candidate servers.

10. The method of claim 9, wherein identifying the one or more servers further includes:

identifying the one or more servers by selectively pruning one or more candidate servers, of the respective candidate servers, associated with nonzero computational task counts.

11. The method of claim 8, further comprising:

assigning at least one computational task to a candidate server, of the plurality of candidate servers, that is not one of the one or more servers.

12. The method of claim 8, wherein the one or more computational tasks are generated automatically.

13. The method of claim 8, wherein the one or more computational tasks are generated based on user input.

14. The method of claim 8, further comprising:

removing candidate servers, from the plurality of candidate servers, that have exceeded a maximum average central processing unit (CPU) threshold over a quantity of CPU cycles.

15. A non-transitory computer-readable medium storing a set of instructions, the set of instructions comprising:

one or more instructions that, when executed by one or more processors of a device, cause the device to:

identify one or more computational tasks;

identify a plurality of candidate servers in a load-balancing server pool;

identify a first set of servers by selectively pruning one or more respective servers, from the plurality of candidate servers, associated with non-zero task counts;

identify a second set of servers by selectively pruning one or more respective servers, from the first set of servers, based further on one or more computational task completion failures occurring within a particular number of minutes before the selective pruning of the one or more respective servers, wherein the one or more computational task completion failures are associated with one or more candidate servers of the plurality of candidate servers; and assign the one or more computational tasks to one or more servers from the second set servers.

16. The non-transitory computer-readable medium of claim 15, wherein the one or more instructions, that cause the device to identify the one or more servers, cause the device to:

identify the one or more servers by selectively pruning the plurality of candidate servers based further on at least one average central processing unit (CPU) utilization, associated with at least one candidate server of the plurality of candidate servers, over a quantity of CPU cycles satisfying an average CPU utilization threshold.

17. The non-transitory computer-readable medium of claim 15, wherein the one or more instructions, when executed by the one or more processors, further cause the device to:

assign at least one computational task to a candidate server, of the plurality of candidate servers, that is not one of the one or more servers.

18. The non-transitory computer-readable medium of claim 15, wherein the one or more computational tasks are generated based on user input.

19. The non-transitory computer-readable medium of claim 15, wherein the one or more instructions, when executed by the one or more processors, further cause the device to:

remove candidate servers, from the plurality of candidate servers, that have exceeded a maximum average central processing unit (CPU) threshold over a quantity of CPU cycles.

20. The non-transitory computer-readable medium of claim 15, wherein the one or more instructions, that cause the device to identify the one or more servers by selectively pruning one or more respective servers associated with nonzero computational task counts, cause the device to:

group the first set of servers by server identifier and computational task count;

obtain, for each group, a corresponding lowest computational task count; and selectively prune, based on obtaining the corresponding lowest computational task count for each group, the one or more respective servers associated with nonzero computational task counts.

* * * * *